United States Patent [19]

Dix et al.

[11] 4,092,681
[45] May 30, 1978

[54] FLEXIBLE DISK FILE ACCESS MECHANISM

[75] Inventors: Gary Lee Dix, Rochester; Charles Christian Hanson; Robin Charles Jahnke, both of Pine Island; Francis Kong King, Rochester, all of Minn.

[73] Assignee: International Business Machines Corporation, Armonk, N.Y.

[21] Appl. No.: 752,766

[22] Filed: Dec. 20, 1976

[51] Int. Cl.² ...................... G11B 21/02; G11B 5/016
[52] U.S. Cl. ......................................... 360/75; 360/99
[58] Field of Search ...................... 360/75, 99, 78, 106

[56] References Cited

U.S. PATENT DOCUMENTS

| | | | |
|---|---|---|---|
| 3,931,645 | 1/1976 | Dodd et al. | 360/75 |
| 3,974,524 | 8/1976 | Griffiths et al. | 360/99 |

*Primary Examiner*—Robert S. Tupper

*Attorney, Agent, or Firm*—Keith T. Bleuer

[57] ABSTRACT

A mechanism for moving an access arm carrying a magnetic transducer into the most appropriate position between pairs of consecutive flexible disks in a rotatable disk stack to assure that the proper disk is thereby accessed. The mechanism includes mechanism for preliminarily accessing each of the disks with a plurality of steps between consecutive disks in the stack and filling a position register with a unique identification number from each disk and with numbers of the steps corresponding to each of the disk numbers and mechanism for averaging the step numbers corresponding to each of the disks and placing the average step number in an access table to correspond with each of the disk numbers so that the access arm may be stepped to the step number listed for each of the disks in the access table for a reading or writing action using the transducer.

12 Claims, 5 Drawing Figures

ACCESS CHARACTERIZATION TIMING

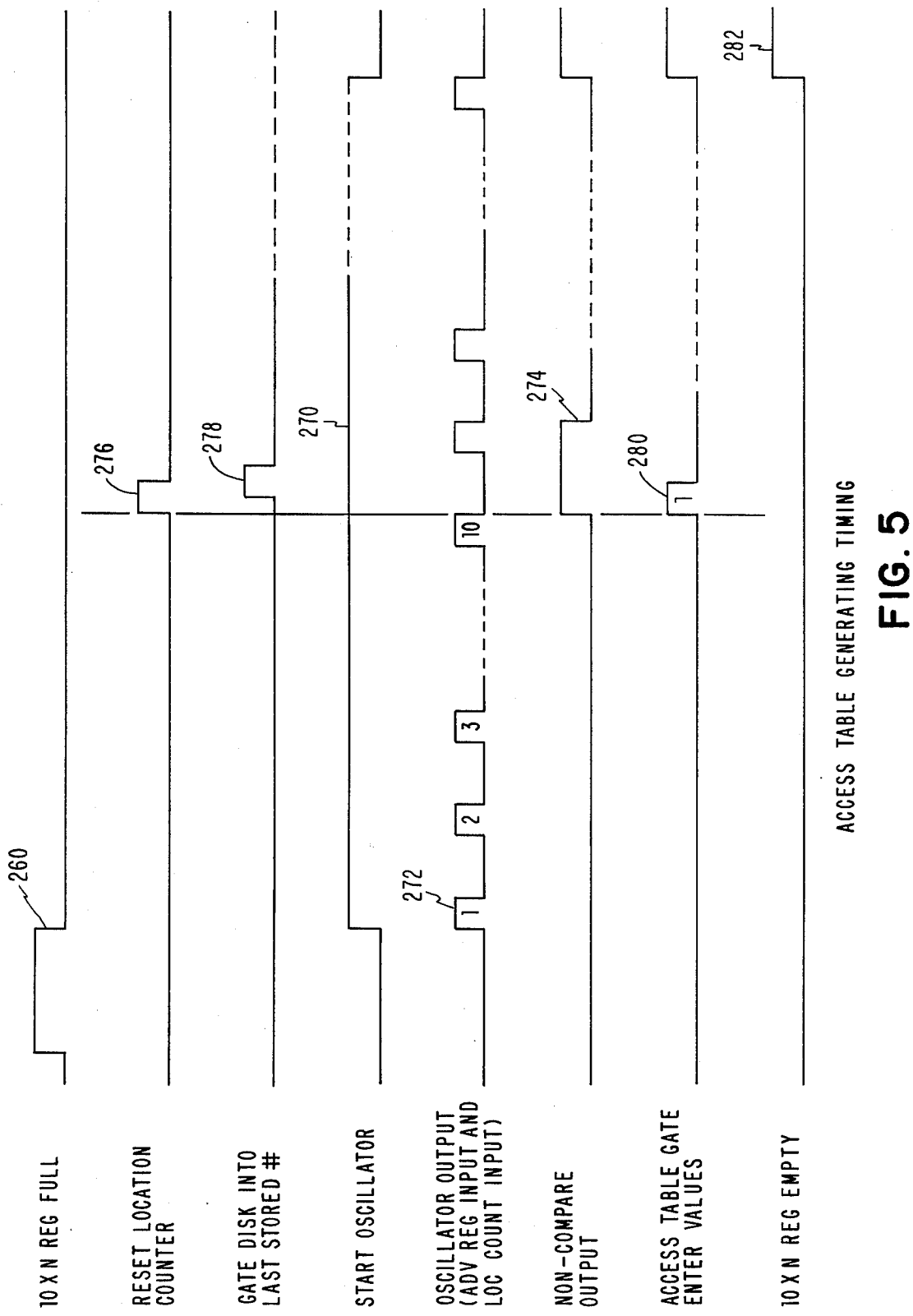
FIG. 5  ACCESS TABLE GENERATING TIMING

FLEXIBLE DISK FILE ACCESS MECHANISM

BACKGROUND OF THE INVENTION

The invention relates to flexible disks in stacked relationship and more particularly to mechanism for moving an access arm carrying a magnetic transducer into the disk stack.

Previous such mechanisms have been used which utilize an electrical stepping motor for moving an access arm carrying a transducer longitudinally of a stack of flexible disks for positioning the access arm and transducer in desired positions along the length of the disk stack prior to moving the access arm and transducer radially into the stack. The stepping motor and the access arm of the transducer have been customarily moved a certain fixed number of steps for each of the flexible disks calculated to position the access arm longitudinally of the stack midway between the disks of each pair of disks throughout the stack. It has been found, however, that the flexible disks are not uniform and that some of them droop more than others, particularly under the action of gravity, assuming that the disk stack is vertical which is preferable. The disks also tend to flutter on their circumferences, and there also may be non-linearities in the positioning of the disks on their drive spindle. For these reasons, stepping the access arm and its transducer for a fixed, predetermined number of steps for each disk longitudinally of the stack in an attempt to position the access arm midway between consecutive pairs of disks throughout the stack is not an entirely satisfactory solution to the problem of positioning the access arm in position to read or write on particular disks in the stack.

SUMMARY OF THE INVENTION

It is an object of the invention to provide mechanism for stepping the access arm and transducer longitudinally of the disk stack to a position which is variable depending on a positioning of the access arm that will be most likely to cause the access arm and its transducer to be in compliance with the exact disk desired for a reading or writing action on a subsequent movement of the access arm and transducer into the stack.

More particularly, it is an object of the invention to provide a unique identification number on each of the disks in the stack and to provide mechanism for preliminarily assessing the disk stack by stepping the access arm and the transducer along the length of the disk stack and matching the step numbers with the disk identification numbers. It is contemplated that the numbers of each of these steps shall be put into and held in a position register along with the corresponding disk identification numbers so that it is thereby determined which of these steps actually corresponds with the disk identification numbers for subsequent proper positioning of the access arm and the transducer for reading or writing on particular ones of the disks.

It is a further object of the invention to provide mechanisms for utilizing step numbers and disk identification numbers so held in the position register and to transfer this information to an access table by means of circuitry that averages the step numbers that correspond with each of the disk identification numbers so that the access arm may be subsequently stepped to the average step number corresponding to any particular disk identification number for thereby positioning the access arm and transducer in positions along the stack that most likely will cause the access arm and transducer to actually be in compliance with the particular disk of the stack that is desired.

BRIEF DESCRIPTION OF THE DRAWINGS

FIGS. 4 and 5 are timing charts illustrating the various pulses in the FIG. 3 circuitry.

DESCRIPTION OF THE PREFERRED EMBODIMENT

Figure 1:
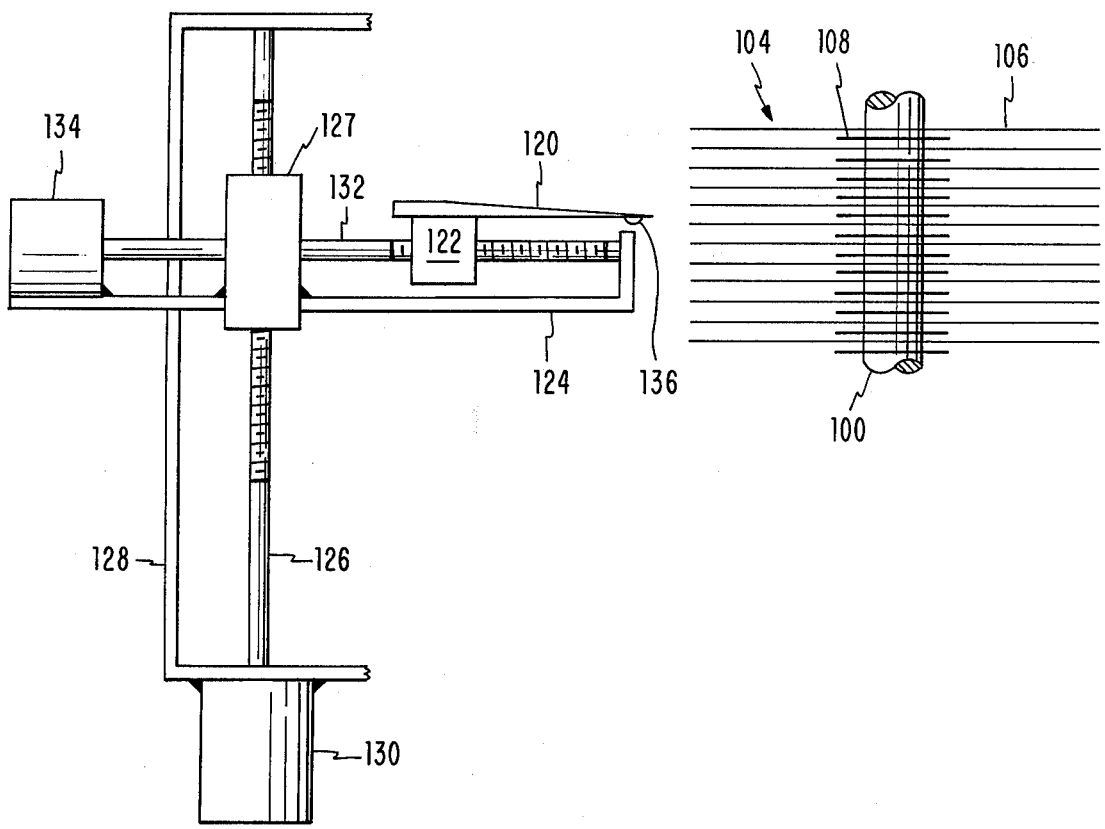
FIG. 1 is a side elevational view of a stack of flexible magnetic disks, together with an access arm carrying a transducer, and stepper motors for moving the access arm longitudinally of the stack and also radially of the stack.

Referring now to FIG. 1 in particular, the random access magnetic recording device therein disclosed may be seen to comprise a vertical spindle 100 adapted to the rotatably driven from any suitable power source. A stack 104 of individual magnetic disks 106 is mounted on the spindle 100. The disks 106 may be of flexible material, such as polyethylene terephthalate Mylar ®, and may be, for example, of 0.003 inch (0.0762 mm) thickness and have an $Fe_2O_3$ coating on both sides. Spacing washers 108 are disposed betwen consecutive disks 106; and each washer may, for example, have a thickness of 0.007 inch (0.177 mm). Thus the center to center vertical spacing of the disks 106 may be 0.010 inch (0.254 mm). Each of the disks 106 has 12 openings 106a through it, and the openings 106a of the disks 106 in their stacked relationship are preferably in alignment. The disks 106 may be fixed with respect to the spindle 100 by any suitable means.

A magnetic access arm or platform 120 is provided for entering between the disks 106. The access arm 120 is fixed with respect to a carriage 122 that in turn is reciprocally mounted within a carriage 124. The carriage 124 is moveable vertically as shown in FIG. 1 and has a lead screw 126 passing through an internally threaded part 127 of the carriage 124. The lead screw 126 is rotatably disposed in a vertical stationary standard 128; and a motor 130 of the electrical stepping type and fixed with respect to the standard 128 is connected to the lead screw 126 for the purpose of rotating the lead screw 126 in one direction or the other for thereby moving the carriage 124 either upwardly or downwardly. The carriage 122 is disposed on and has a screw threaded engagement with the lead screw 132 carried by the carriage 124; and a motor 134 of the electrical stepping type is fixed with respect to the carriage 124 for the purpose of drivingly rotating the screw 132 in one direction or the other for thereby moving the carriage 122 and thereby the access arm 120 toward and away from the spindle 100. The access arm 120 has a magnetic transducer 136 embedded in it and protruding from its lower surface; and, when the access arm 120 is moved between a pair of the disks 106, the transducer 136 has a close compliance with the disk 106 just below the access arm 120 so that a magnetic recording or reading operation may be effected with respect to this particular disk 106. The access arm 120 with its transducer 136 may be of the same type as is described in Francis K. King U.S. Pat. No. 3,975,769 issued Aug. 17, 1976.

Figure 3:
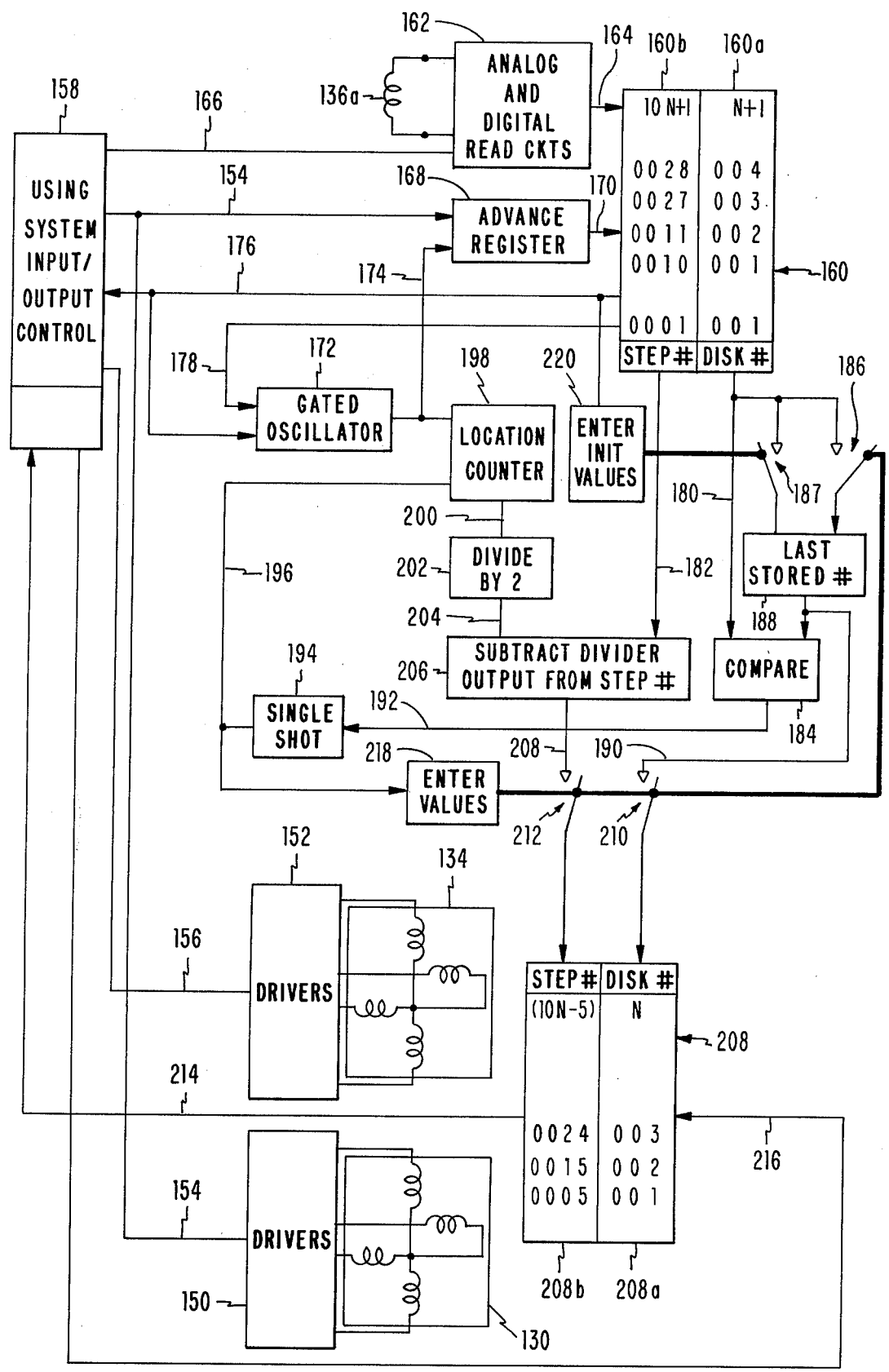
FIG. 3 is a diagram showing circuitry for controlling the stepper motors and embodying the principles of the invention.

The control system shown in FIG. 3 comprises Drivers 150 and 152 for respectively energizing the vertical stepping motor 130 and the horizontal stepping motor 134, and these drivers are connected by means of Vertical Step bus 154 and Horizontal Step bus 156 with a control computer or Using System 158. The Drivers 150 and 152 for the electrical stepping motors 130 and 134 may for example be of the type described in Kenneth A. Hendrickson et al U.S. Pat. No. 3,849,714, issued Nov. 19, 1974.

The FIG. 3 system includes a 10 X N Position Register 160. The term "N" refers to the number of disks 106 in the stack 104, and this may be 150 disks, for example. The Position Register 160 has two sections, namely, an "N+1" section 160a and a "10N+1" section 160b. The register section 160a is adapted to contain the numbers of the various disks 106 in the stack 104, and the register section 106b is adapted to contain 10N+1 of digits as will hereinafter appear.

The register 160 is adapted to be controlled by Analog and Digital Read Circuits 162 connected by a bus 164 with register 160. The transducer 136 has a winding 136a, and the winding 136a is connected to the circuits 162 as an input. Using System 158 is also adapted to control the Analog And Digital Read Circuits 162, and this is by means of a Read bus 166.

The register 160 is also controlled by an Advance Register 168 connected by means of bus 170 with the register 160. The Advance Register 168 is controlled by a Gated Oscillator 172 that is connected by means of lead 174 with the Advance Register 168. The Advance Register 168 also has the Vertical Step bus 154 connected to it as an input as shown.

The Position Register 160 has a plurality of outputs including the Register Full lead 176 and the Register Empty lead 178. Both of the leads 176 and 178 are connected to the Gated Oscillator 172 as inputs, and the lead 176 is also connected to the Using System 158 as an input.

The Position Register 160 has the buses 180 and 182 as outputs. The bus 180 may be termed a Present Number bus and is effective on the register section 160a for withdrawing values from this register section, and the bus 182 is effective for the same purpose in connection with the register section 160b. The bus 180 is connected as an input to a Compare circuit 184 and is also connected through switches 186 and 187 with a Last Stored Number register 188. The Last Stored Number register 188 is connected by means of a Stored Number bus 190 with Compare circuit 184 to provide an input thereto. The Compare circuit 184 has a Present Number Greater bus 192 as an output, and this is applied onto a Single Shot 194 which in turn has the Reset lead 196 as an output.

The lead 196 and also the lead 174 are applied as inputs to a Location Counter 198. The output of the Location Counter 198 is applied by means a lead 200 to a Divide By Two logic block 202, and the output of the logic block 202 is applied by means of a lead 204 onto the Substract Divider Output From STep Number block 206. The bus 182 constituting the output from the register section 160b is also applied as an input to the block 206.

Data from the 10 X N Position Register 160 is applied to an Access Table 208 having a Disk Number section 208a and a Step Number section 208b. This is accomplished by the Stored Number bus 190 and also by a bus 208 constituting an output of the Substract Divider Output From Step Number block 206. The buses 190 and 208 are respectively connected with the Access Table sections 208a and 208b through switches 210 and 212.

The Access Table 208 is connected with the Using System 158 by means of an outgoing Step Number bus 214 and by means of an incoming Select Disk bus 216. In particular, the Access Table sections 208a and 208b are respectively connected with the buses 216 and 214.

The switches 186, 210 and 221 are controlled from an Enter Values controller 218 which may be effective to open and close the switches 186, 210 and 212 either mechanically or electrically as may be appropriate. The controller 218 is energized from Reset lead 196. A similar Enter Initial Values controller 220 opens and closes switch 187.

Figure 2:
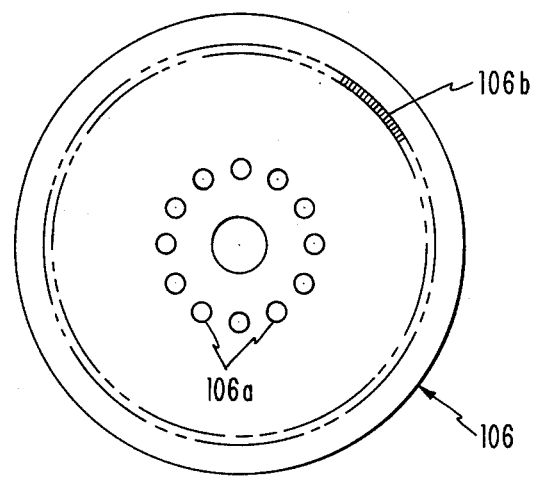
FIG. 2 is a plan view on an enlarged scale of one of the disks.

Each of the disks 106 is provided with a unique identification number on its outer track 106b (See FIG. 2). The lowermost disk 106 in the stack 104 may thus be provided with the identification number "1" in any suitable code on its outermost track 106b. Likewise, the disk 106 just above the lowermost disk 106 may be provided on its outermost track 106b with the identification number "2," and the disks 106 above the lowermost two disks in the stack 104 may be provided with successively increasing identification numbers on their outermost tracks 106b. If the disk stack 104 is made up of 150 disks 106, for example, the identification numbers wiritten on their outermost tracks 106b would be 1–150 starting with the lowermost disk 106 in the stack.

In a preliminary assessing operation of the disk stack 104, the 10N+1 Position Register 160 is used to store the disk identification number of the disk 106 for each of a plurality of vertical steps through which the transduer 136 and arm 120 are preliminarily moved. It is contemplated that the arm 120 and transducer 136 may be moved vertically on the average of 10 steps for each of the disks 106 so that, for the 150 disk stack mentioned above as an example, transducer 136 and the arm 120 will be moved 1500 vertical steps in this preliminary assessing of the stack 104.

In this preliminary assessing operation, the Using System 158 first operates to actuate the vertical stepping motor 130 so as to step the motor 130 for one step. At the same time, the Using System 158 enters the first step number (0001) in the register section 160b. The Using System 158 then actuates the horizontal stepping motor 134 so as to move the carriage 122 and transducer 136 between the lowermost pair of disks 106 in the stack 104 to a position in which the transducer 136 is in compliance with the outermost track 106b of the lowermost disk 106 in the stack. The Using System 158 then causes the transducer 136 to read the identifier number on the outermost track 106b of the lowermost disk 106 and enters this identifier number in the register section 160a in a position that corresponds with the step number 0001 and moves the access arm 120 and transducer 136 outwardly of the disk stack 104 to their original position. The Using System 158 continues this operation, upwardly stepping the access arm 120 and transducer 136, moving the arm 120 and transducer 136 into the disk stack 104, reading the identifier number on the disk 106 just below the transducer 136, entering the identifier number just read in a position in register 160 just above the identifier number just previously read and at a position corresponding to the new step number and withdrawing the arm 120 and transducer 136 from the stack 106. The Using System 156 causes such a series of steps to occur ten times for each of the disks 106 in the stack 104, although it will be understood that this number can well be varied if desired. The ten vertical steps for each of the disks 106 move the arm 120 and transducer 136 for a distance of 0.010 inch vertically, and this corresponds with the center to center spacing of the disks 106 in the stack 104. Due to the shape of the access arm 120 as the arm 120 is moved toward the stack with each of the vertical steps, the arm 120 will enter into the space between a pair of the disks 106 rather than abutting against any of the disks 106, this being by virtue of the shape of the arm 120 and the air forces effective on the disks 106 as the arm 120 moves toward the spindle 100. For this action, the arm 120 may for example have the shape disclosed in Francis K. King U.S. Pat. No. 3,975,769. This preliminary assessing operation continues for the complete stack 104 for 150 disks and 1500 vertical steps assuming that the stack is made up of 150 disks and that 10 vertical steps are used per disk. When the 1500 vertical steps of the transducer 136 have been completed, the register 160 has been filled and contains 150 disk numbers and the corresponding 1500 step numbers.

In this operation, the Advance Register 168 is effective to open up and make available successive positions in the register section 160a for the reception of the disk numbers being read from the outermost tracks 106b and to enter a new step number in the register section 160b for each of the vertical steps that stepper motor 130 is effective to move the access arm 120 and transducer 136. The Analog And Digital Read Circuits 162 are effective for entering the identification number read by the transducer 136 into the register section 160a.

There are 10 step numbers that correspond on the average with each of the disk numbers; however, due to the non-linearity in the positioning of the disks 106 on the spindle 100 and due to the flutter on the disk circumferences, this correspondence of disk numbers and step numbers may not be exact; in fact, it is the primary purpose of the invention to determine the lack of correspondence of the step numbers with respect to the disk numbers. in the FIG. 3 illustration, it is assumed that the lowermost disk 106 in the stack 104 and the space between the two lowermost disks in the stack 104 are average and that vertical steps 0001 to 0010 correspond with disk number 0001. Thus, each of steps 0001 to 0010 will have disk number 0001 corresponding to it in the register 160. If the spacing between the third and fourth disks in the stack 104 is not average, steps "0021" to "0027" for example may correspond with disk identification number "0003" in register 160 as shown in FIG. 3. Thus, only seven vertical steps of arm 120 and transducer 136 correspond with the third, lowermost disk 106 in the stack 104.

Figure 4:
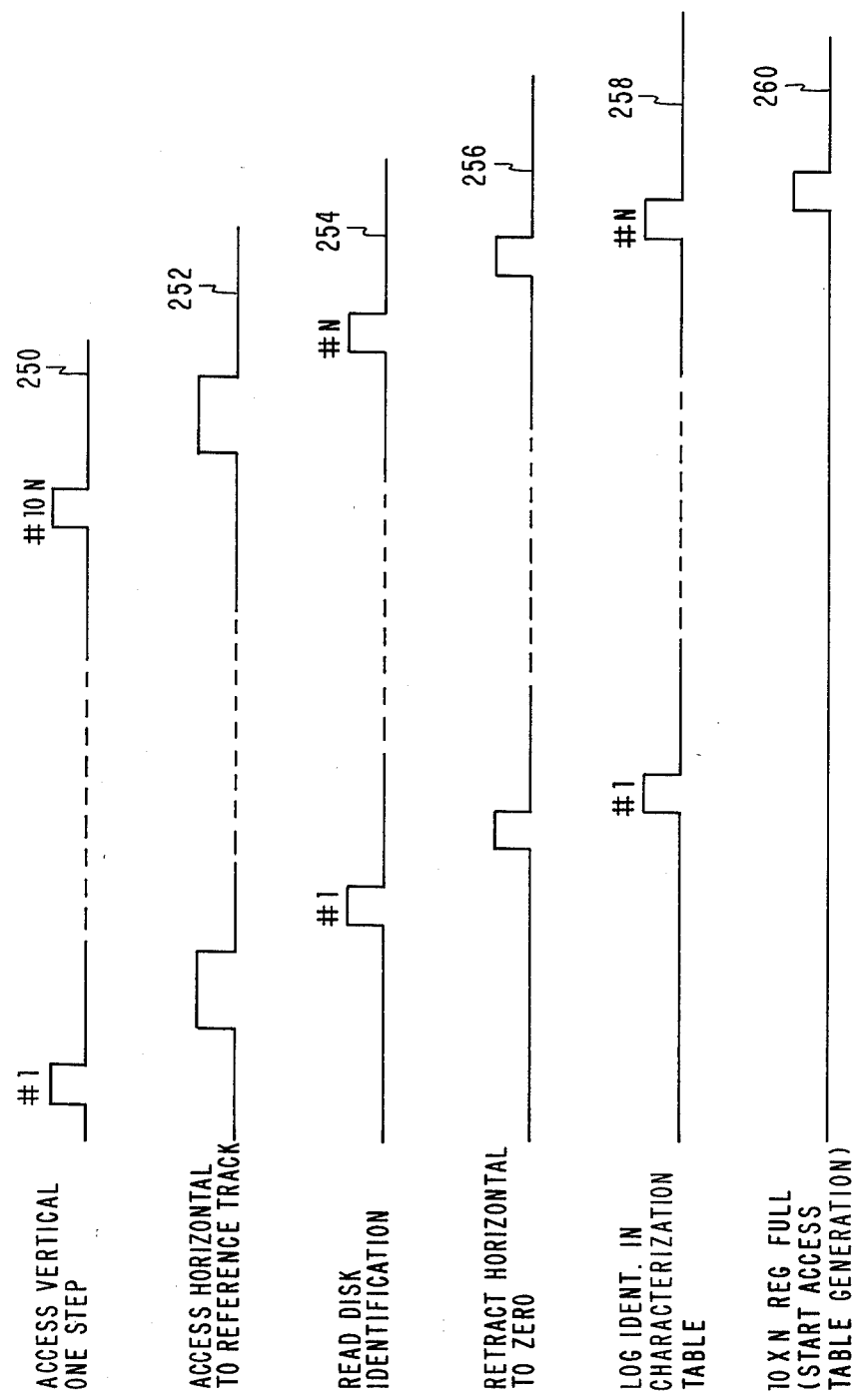

FIG. 4 may be referred to for a more particular description of the various signals and pulses causing the transducer 136 to successively read identifier numbers from the outermost tracks 106b of the succesive disks 106, with an average of 10 vertical steps between the disks. For each of the reading operations and for each of the vertical steps of the access arm 120 and transducer 136, the pulses 250, 252, 254, 256 and 258 are generated, this being by the Using System 158. For the first vertical step, a first pulse 250 is generated by Using System 158; and this is applied through the Vertical Step line 154 to the Advance Register 168 and to the vertical motor 130 through the Drivers 150. This pulse has the effect of causing the stepping motor 130 to move through one step to move the arm 120 and transducer 136 upwardly one step and to cause the Advance Register 168 to render the next input to the register section 160a at the first position therein and to enter the number "0001" in section 160b of the register 160. The following pulse 252 is applied through the Horizontal Step line 156 on the Drivers 152 for the stepping motor 134 so as to cause the motor 134 to move the access arm 120 and transducer 136 radially toward the spindle 100 and between the lowermost two disks 106 in the stack 104 so as to register the transducer 136 with the identifier track 106b of the lowermost disk 106. The following pulse 254 is applied through the Read line 166 to the Analog And Digital Read Circuits 162 to cause the transducer 136 to read the identifier number in the outermost track of the lowermost disk 106. The following pulse 256 is applied through the Horizontal Step bus 156 onto the Drivers 152, causing the motor 134 to be active to move the access arm 120 and the transducer 136 out of the space between the two lowermost disks 106. The following pulse 258 is applied through the Read line 166 onto the Analog And Digital Read Circuits 162 and causes the identification number just read by the transducer 136 to be logged into the section 160a of the register 160 so that this identification number appears opposite the step number which has previously been logged into the register 160 due to the action of the previous pulse 250. Thus, the register 160 now contains a number in the section 160b corresponding to the vertical step just taken together with a corresponding disk identifier number in register section 160a.

Following the succession of pulses 250, 252, 254, 256 and 258 with the results just described, the Using System 158 produces additional series of these five pulses. Each series of these pulses has the same effects as the first series of pulses, namely, in stepping the vertical motor 130 one step, stepping the arm 120 and transducer 136 one step upwardly, moving the arm 120 and transducer 136 inwardly toward the spindle 100 to provide compliance between the transducer 136 and the outer track 106b of the disk 106 below the arm 120, causing the transducer 136 to read this identifier number, retracting the arm 120 and transducer from between the disks 106 and entering both the step number and the corresponding disk identifier number into the register 160. The Using System 158 continues to issue these series of pulses until all of the identifier numbers on all of the disks 106 have been read; and, since there are ten of the vertical steps of the arm 120 and transducer 136 for each of the disks 106, the total number of step numbers eventually entered in the register 160 will amount to 1501, corresponding to the 151 disk numbers within the register 160 at this time.

The register 160 is filled at this time, all of the 150 disks in the stack 104 having been read. The circuitry then functions to transfer the data in register 160 with modifications, as will be described, to the Access Table 208; and this is initiated by the Register Full pulse 260 (see FIG. 4) supplied under these conditions on the Register Full line 176.

The remainder of the FIG. 3 circuitry not specifically discussed just above is for the purpose of transferring each of the disk numbers contained in the register 160 to the Access Table 208, averaging the step numbers that correspond with each of the disk numbers in register 160, and transferring the average step number corresponding to each of the disk numbers to a position in the Access Table 208 that corresponds with each of the disk numbers. Thus, for subsequent processing, the average step number for each disk number is contained in the Access Table 208, so that this particular step number may be used for accurately vertically locating the access arm 120 and trasducer 136 with respect to any particular disk 106 in the stack 104 and the space between this disk and the disk just above it in the stack so as to assure that the access arm 120 actually accesses the particular disk 106 that is desired.

In this operation, the Gated Oscillator 172 has the function of providing output pulses directed to the Location Counter 198 and to the Advance Register 168. The Location Counter 198 counts these pulses from the oscillator 172 and supplies the counts to the divider circuit 202. The divider circuit 202 divides these pulses by two and supplies them through bus 204 to the subtracter circuit 206. Thus, as the oscillator counts 1, 2, 3, 4, 5, 6, 7, 8, for example, the count supplied by the divider circuit 202 to the subtractor circuit 206 through the bus 204 will respectively, be 1, 1, 2, 2, 3, 3, 4 and 4. The pulses from the oscillator 172 are effective on the Advanve Register 168 so as to cause the Advance Register 168 to successively move the step numbers out of the rgister 160 through bus 182 onto the subtracter circuit 206. Thus, for the first eight pulses output of oscillator 172, step numbers 0001 to 0008 will be successively moved through bus 182 for application to the subtracter circuit 206. The subtracter circuit 206 subtracts the output of the divider circuit 202 from each step number supplied through bus 182 from register 160 and provides this output on bus 208. Thus, for example, when the step number 004 is supplied to subtracter 206, the digit on the bus 204 will be 2 and the digit 002 will be carried by bus 208.

Under the control of the Gated Oscillator 172, the Advance Register 168 also moves the disk numbers out of the register 160 that corresponds with the step numbers then being moved out of the register 160. Thus, for each of the first eight steps previously mentioned, the disk number 001 will be moved in each case out of the register 160 and is applied on the Present Number bus 180 for application thereby to the Compare circuit 184. The initial content of the Last Stored Number register 188 is 001, and this value is applied through the bus 190 on the Compare circuit 184. The Compare circuit 184 has no output on the Present Number Greater bus 192 as long as the two values supplied to the Compare circuit 184 are the same.

When the oscillator 172 is effective on the Advance Register 168 so as to cause the disk number "0002" to be first withdrawn from the register section 160a and applied through the bus 180 on the compare circuit 184 (this is at the time step number 011 also moves out of register 160 on bus 182), it is apparent that the two inputs to the Compare circuit 184 are not equal at this time. The Compare circuit 184 thus at this time provides an output on the Present Number Greater bus 192 applied to Single Shot 194 which then has an output for a number of purposes.

The output of the Single Shot 194 on the Reset lead 196 has the effect of resetting the Location Counter 198 to one at this time. The signal on the lead 196 also is effective on the Enter Values controller 218 which closes the three switches 186, 210 and 212. The last stored number out of register 188 is gated through the switch 210 to the disk number section 208a of the Access Table 208, and the output of the subtracter circuit 206 is gated via the switch 212 to the step number section 208b of the Access Table 208. Thus, for eample, if it has required the first 11 pulses output of the oscillator 172 to change the output of the section 160a of the register 160 from "001" to "002"; the last stored number from the register 188 transmitted through the switch 210 to the section 208a of the Access Table 208 will be "001,38 and the output from the divider circuit 206 transmitted through the switch 212 to the section 208b of the Access Table 208 will be "0005."These value are shown in the lowermost portion of the Access Table 208 as it is shown in FIG. 3 and exist simultaneously and in correspondence with each other in the Access Table 208 at this time.

Likewise, if the second change of disk numbers withdrawn from the regiser 160, from 002 to 003, occurs on the first twenty-one pulses outputted from the oscillator 172, the subtracter circit 206 will have an output of 015; and the last stored number will be 002, so that the step number 0015 will be in the Access Table 208 at a position corresponding to the disk number 002.

It is of course contemplated that it may require a greater number or lesser number than multiple of 10 upward steps of access arm 120 and transducer 136 to actually cause the arm 120 to enter into a succeeding space between consecutive disks 106 in the stack 104 due the lack of uniformity of the disks 106 as previously described. For example, the digit 003 in the register section 160a may change to the digit 004 at step number 0028 instead of step number 0030. In this case, as shown in FIG. 3, step 0027 would correspond with disk number 003, and step number 0028 would correspond with disk number 004. It is assumed that the change from disk number 002 to 003, was average and occurred when the step count of 0020 for disk number 002 changed to step number 0021 for disk number 003.

These values for the content of the register 160 would result in step number 0024 being entered opposite disk number 003 in the Access Table 208. When the value 004 is first brought out of the register 160 onto the bus 180 and to the compare circuit 184, the last stored number in register 188 is 003, and this causes the Compare circuit 184 to provide an output on bus 192 applied to Single Shot 194 for activating Single Shot 194. At the time the disk number 004 is brought out of register 160, step number 0028 is moved out of register 160 onto bus 182 and from thence onto substract circuit 206. The Location Counter 198 at this time has a count of eight therein so that, as a result of the division by circuit 202, the count of four is applied onto the substract circuit 206 through bus 204. The subtract circuit 206 subtracts the value of four from step number 0028 so that the value 0024 is applied onto bus 208 from circuit 206. When the Enter Values controller 208 is effective to close switches 210 and 212, the disk number 003 is moved into section 208a of Access Table 208 and step number 0024 is moved into the step number section 208b of Access Table 208.

The portion of the FIG. 3 circuitry just discussed continues its operation of filling the Access Table 208 with values from the 10N+1 position register 160, with the process continuing until all 150 disk numbers are present in Access Table 208; and there is an average step number in section 208b of table 208 corresponding to each of the disk numbers in section 208a of table 208. These average step number values represent the median numbers of steps of the stepper motor 130 and of the access arm 120 in order that the access arem 120 shall move quite accurately into a particular gap between two particular disks into which it is desired that the access arm 120 shall move.

FIG. 5 shows in some detail the various pulses effective for causing this transfer of information from the register 160 in modified form to the Access Table 208. The 10N+1 Register Full pulse 260 is on the Register Full lead 176, being provided by the register 160 when full. The oscillator 172 is started by the Register Full pulse 260 as is shown by the curve 270 so that the oscillator 172 then provides the output pulses 272 on the lead 174. The oscillator output pulses 272 on the line 174 simultaneously cause the Advance Register 168 to point to successive positions in the 10 X N Position Register 160 and to increase the count in Location Counter 198.

A non-compare output pulse 274 occurs on the Present Number Greater bus 192 when there are different inputs to the Compare circuit 184 as above described. This is shown at the end of 11 oscillator pulse 172 in FIG. 5; however, as as has been previously explained, this could occur at the end of other pulses adjacent to the tenth pulse, namely, for example, at the end of the eight, ninth, 11 or 12 pulses 272 shown in FIG. 5, dependin on how much variation any one of the particular disks 106 may have with respect to an average expected position on its circumference. The pulse 274 fires the Single Shot 194 so that the pulses 276, 278 and 280 exist at that time. The pulse 276 is an electrical pulse on the line 196 and resets the location counter 198. The pulse 278 indicates a closing of the switch 186 so as to enter a new value of disk number into the Last Stored Number register 188. The pulse 280 indicates a closing of the switches 210 and 212 providing new disk number and step number values in the tble 208. The 10N+1 Register Empty signal 282 shown in FIG. 5 is effective on the oscillator 172 for causin the oscillator to stop its operation when the register 160 is empty.

The portion of the FIG. 3 circuit just described for transferring data from the register 160 to the table 208 is initiated for operation by the Register Full signal on line 176 provided when register 160 is full. The Enter Initial Values controller 220 is actuated at this time by the signal on line 176 so as to close switch 187 and move the disk number value at the withdrawal position of register 160 into the Last Stored Number register 188. When the register 160 is full, it contains disk numbers 001 to 151; and disk number 001 is at the withdrawal position of register 160. Thus, the value 001 is moved at this time into the Last Stored Number register 188, so that there will initially be a compare between the values applied to the Compare circuit 184 from the 10N+1 Position Register 160 and the Last Stored Number register 188.

With the Access table 208 containing all of the disk numbers in the section 208a and containing corresponding step numbers in the section 208b that represent the best vertical location into which the platform 120 may be moved to assure that it is moved without interference and into the correct place in the disk stack 104, the Using system 158 is effective to utilize the numbers in the table 208 for this purpose. When the circuitry of the Using System 158 directs that either a reading or writing operation be performed with respect to one of the disks 104, it interrogates the Access Table 208 with a code representing one of the disks such as, for example, the disk 003. The corresonding step number is passed back from the Access Table 208 on the Step Number bus 214 to the Using System 158. For example, for disk number 003, values representing step number 0024 will be passed on the Step Number bus 214 back to the using System 158 then generates the appropriate number of steps to the Drivers 150 for the vertical motor 130 so as to position the access arm 120 in the best average position for insertion between disks 3 and 4 of the stack 104. The Using System 158 then actuates the Drivers 152 for the horizontal stepping motor 134 so as to move the access arm 120 and transducer 136 sufficiently ointo the disk stack 104 for reading or for writing on the desired track on the disk 106 below the access arm 120.

The FIG. 3 circuitry advantageously first assesses the disk stack 104 by causing the transducer 136 to read the disk identifier numbeers for a number of vertical steps which is a multiple of the number of disks 106 and then averages the step numbers for each disk and stores this information in the Acces Table 208 for later use in accessing. The invention thus assures that the transducer 136 may be moved in compliance with a particular desired one of the disks 106 for a reading or writing action.

We claim:

1. A data storage device comprising:
a stack of axially aligned flexible disks,
a drive spindle on which said disks are mounted for rotating the disks,
a unique identification character on each of said disks,
means for sensing said identification characters,
first moving means for moving said sensing means in a path outside of said disk stack and along said stack substantially parallel with the axis of the stack,
controlling means for said moving means so as to cause said sensing means to be positioned at a plurality of stepped positions in said path between each pair of disks in said stack all of which positions are identifiable by a step number,
controlling means for said sensing means to cause said sensing means to detect the said identification character of an adjacent one of said disks for each of said stepped positions,
a position register for storing said step numbers for each of said identification characters detected by said sensing means and
means for averaging said step numbers for each of said identification characters and corresponding to each pair of disks in said stack.

2. A data storage device as set forth in claim 1 and including second moving means for moving said sensing means into said disk stack from each of said stepped positions of said sensing means along said stack so that said sensing means may detect the corresponding one of said identification characters in each of its said stepped positions.

3. A data storage device as set forth in claim 1, said unique identification character on each of said disks constituting an identification number magnetically encoded thereon and said sensing means including a magnetic transducer.

4. A data storage device as set forth in claim 1 and including an access table for holding the average step numbers derived from said averaging means corresponding with said identification characters sensed by said sensing means from said disks.

5. A data storage device as set forth in claim 1 and including means for withdrawing said average step numbers from said access table and applying corresponding signals to said first moving means so as to move said sensing means to average stepped positions along and outside of said stack for each of said identification numbers and thereby for the corresponding ones of said disks.

6. A data storage device as set forth in claim 5, said averaging means including:
   an oscillator,
   a divider circuit connected to receive oscillations from said oscillator to provide oscillations of lower frequency than the oscillations of said oscillator,
   a subtracter circuit for receiving said lower frequency oscillations from said divider circuit, and
   means for connecting the output of said oscillator with said position register so as to provide consecutive step numbers from said position regiser to said substracter circuit whereby the substracter circuit substracts the output of said divider circuit from the step numbers supplied from said position register.

7. A data storage device as set forth in claim 5 and including a compare circuit connected with said position register so so as to receive a disk identification number from said register, a storing register for storing a disk identification number and having its output and thereby its content connected as an input to said compare circuit, said compare circuit providing an output when the disk identification number supplied from said position register is greater than the output of said storing register supplied to said compare circuit, switch means for connecting the output of said storing register with said access table to supply a disk identification number to said access table, and means connecting the output of said compare logic with said switch means for closing said switch means when the disk identification number supplied to said compare circuit is larger than the disk identification number supplied to said compare circuit from said storing register.

8. A data storage device as set forth in claim 5,
   said averaging means including an oscillator, a divider circuit connected with the output of said oscillator for dividing the frequency of the pulses from said oscillator, a subtracter circuit connected to receive the lower frequency pulses provided by said divider circuit, means connecting said oscillator with said position register so as to sequentially provde step numbers from said position register and applied onto said subtracter circuit whereby the subtracter circuit subtracts the output of said divider circuit with the step number received from said position register to provide an average step number output,
   a compare circuit receiving the disk numbers from said position register as an input,
   a stored number register for storing a disk identification number and having its output connected as an input to said compare circuit, said compare circuit providing an output when the disk identification number provided from said position register is greater than that received from said stored number register,
   switch means connecting said position register with said stored number register for providing disk identification number thereto,
   switch means connecting the output of said stored number register with said access table to provide disk identification numbers thereto,
   switch means connecting the output of said substracter circuit with said access table to provide average step numbers thereto, and
   means connecting the output of said compare circuit with said three switch means for closing said three switch means when there is an output from said compare circuit.

9. A method for setting an appropriate position of an access arm in the direction of movement of the access arm along the axis of rotation of a pair of spaced flexible disks for reliable insertion of the access arm into the space between the disks, comprising the steps of:
   moving the access arm in to and fro probing movements toward and away from the axis of rotation of the disks from a series of successive positions outside of the disks that are spaced from one another in one direction in a path substantially parallel with said axis, said positions being such in number and spacing so that the access arm in its to and fro movements contacts the outer oppositely facing faces of the disks in different ones of said to and fro movements and the positions include a plurality of positions opposite to and from which the access arm enters the space between said pair of disks,
   determining a first boundary one of said positions at which the access arm first moves into the space between the two disks and a second boundary one of said positions at which the access arm first moves out of sid space on different ones of said to and fro movements from said successive positions in travelling in said path in said one direction outside of the disks by using the access arm to sense the proximity of a surface of each of the disks to the arm when the access arm moves toward said axis, and
   selecting an average one of said positions of said access arm intermediate said boundary positions so as to thereby select said appropriate access arm position.

10. A method for setting intermediate positions along the length of a stack of rotatably disposed flexible disks for insertion of a sensing device into the spaces between adjacent ones of the disks, comprising the steps of:
   providing identification characters on each of said disks of a type adapted to be sensed by said sensing device,
   moving said sensing device to a series of successive positions outside of said disks that are spaced from one another in one direction in a path substantially parallel with said axis,
   moving said sensing device in a to and fro probing movement into and back out of said disk stack at each of said positions of the sensing device along the stack with said positions in number being greater than the number of disks and including a plurality of positions for each pair of disks in which said sensing device is opposite to and moves into and back out of the same space between each disk pair,
   determining a first boundary one of said positions at which the sensing device first moves into the space between each pair of disks and a second boundary one of said positions at which the sensing device first moves out of said space on different ones of said to and fro movements from said series of successive positions in travelling in said path in said one direction by causing said sensing device to read said identification characters on each of its movements into the space between each pair of disks and comparing the disk identification characters as read by said sensing device during said to and fro movements, and selecting an intermediate position between said two boundry positions with respect to each pair of disks in the stack for thereby setting a position of the sensing device in which the sensing device may be subsequently reliably moved into each of the spaces between pairs of disks in the stack.

11. A method as set forth in claim 10 in which said positions along the flexible stack are numbered and in which said intermediate position for each disk pair is selected by averaging the position numbers between said two boundary positions of said sensing device for each disk pair.

12. A method for setting intermediate positions along the length of a stack of rotatably disposed flexible disks by means of a sensing device, comprising the steps of:

providing unique identification characters on sid disks of type adapted to be sensed by said sensing device, moving said sensing device into a series of succesive positions outside of the disk stack that are spaced from one another in one direction in a path substantially parallel with the axis of the stack, said positions including a plurality of said positions between each pair of disks in the stack and said positions being identifiable by a step number, causing said sensing device to read the identification character on an adjacent one of the disks from each of said successive positions, storing said step numbers for each of said identification characters detected by said sensing means, and averaging said step numbers for each of said identification characters as so stored so as to provide an average step number for each of said identification characters and thereby for each pair of disks in the stack.

* * * * *